No. 748,270. Patented December 29, 1903.

UNITED STATES PATENT OFFICE.

WILLIAM O. EMERY, OF CRAWFORDSVILLE, INDIANA.

MATERIAL FOR PROTECTING IRONWORK AND METHOD OF PREPARING SAME.

SPECIFICATION forming part of Letters Patent No. 748,270, dated December 29, 1903.

Application filed June 14, 1902. Serial No. 111,679. (No specimens.)

*To all whom it may concern:*

Be it known that I, WILLIAM O. EMERY, a citizen of the United States, residing at Crawfordsville, in the county of Montgomery and State of Indiana, have invented a new and useful Material for Protecting Ironwork and Method of Preparing Same, of which the following is a specification.

This invention relates to a composition of matter to be used as a protective coating for iron or metal work.

The especial object of this invention is to provide a material which will form a substantially impervious, durable, and substantially indestructible coating for iron or metal work, cables, &c., having little or no conductive capacity for electricity.

To this end this invention consists of a compound resulting from the union of asphalt with a complex silicate and aluminate of calcium and sodium.

One of the most serious problems in the protection of all classes of ironwork, especially in maintaining underground conduits— such, for example, as gas-piping, water-piping, or conduits for carrying electric wires— is the prevention of corrosion, and especially the protection of structures of this class from electrolysis. This is especially the case in locations where trolley-currents are employed or connection which is liable to be made with other powerful electric circuits. In practice it is now customary to coat ironwork of this class with asphaltum paints or other similar compounds. The protective coatings which have heretofore been employed, however, have ordinarily depended for their efficiency upon the resistance of the asphaltum or other material of this class to the transmission of electricity, and while asphaltum and materials of this class are ordinarily poor conductors of electricity yet when exposed to the action of strong electric currents the asphaltum quickly breaks down and does not maintain perfect insulation.

As distinguished from protective coatings relying upon their resistance of asphaltum or similar material I have provided a material for protecting ironwork which will secure a permanent insulation of the ironwork to which it is applied as a coating by reason of the presence of the silicates of calcium and sodium with an aluminate of calcium.

The proportions of the elements entering into my compound may be considerably varied, according to the degree of resistance desired, such resistance depending in no small degree upon the alumina content.

In practice the matrix of my protecting compound may consist of any refined asphalt, coal-tar, or pitch, though I have secured the best results with that grade of oil-asphalt known to the trade as "D" or medium asphalt from California oil. The resistant material which is combined with the matrix is highly complex in chemical makeup, but consists largely of a silicate of calcium and sodium, together with an aluminate of calcium, both of which are chemically associated. This complex substance I prepare by fusing at white heat quicklime, quartz, feldspar, alumina, sulfate of soda, and charcoal, in such proportions as will at said white heat yield a clear highly-viscous mass. In some cases I have omitted the charcoal; but the presence of charcoal I have found to be desirable, as the same reacts with the sulfate of soda, although the charcoal does not enter into the finished product. When the resulting flux has cooled, it is crushed, powdered, and bolted, giving a grayish-white impalpable powder. In practice considerable variation may be allowed in the proportion of the materials employed, the resistant powder varying from that which may have a formula $(Na_2O, K_2O).CaO.6SiO_2$ to a powder which would have substantially the formula $5(Na_2O, K_2O).7CaO.37SiO_2$, which two formulæ, it is to be understood, outline the extent of variation to which the constituents are subject. The oxids of soda and potassa may alternate or replace one another without apparent effect on the general character of the mass, (at least for the purpose of this invention.) The alumina introduced replaces a proportionate amount of calcium oxid in the formulæ cited and appears to form an aluminate of calcium in the end, and it is to this that the resistant quality of my compound is largely due. In addition to the ingredients noted in the formulæ given the finished material usually contains small amounts of iron and magnesia. The presence of these substances, however, in no way affects the desired results. The asphalt is next melted, compressed air sometimes being injected into the molten mass, the temperature is raised to 148° centigrade, and the powdered product is added in proportions varying, according to the use intended, from ten to fifty per cent. of asphalt. In the meantime the temperature is gradually raised to 165° centigrade and there maintained from fifteen to thirty minutes. The mass is now ready for application to the pipes, structural iron, cables, metal-work, &c., upon which it is to be used as a protective coating.

In some cases instead of applying my compound while melted it may be applied through partial solution in wood-alcohol, naphtha, or gasolene, although I prefer to apply the same hot in small work, preferably dipping the iron or metal parts to be protected directly into a bath of the molten compound.

Having thus fully described my invention, what I claim as new, and desire to secure by Letters Patent of the United States, is—

1. A material for protecting iron or metal work, cables, and for similar purposes, consisting of asphalt as a matrix carrying a resisting material, comprising silicates of calcium and sodium and an aluminate of calcium.

2. The method of preparing a protecting material for iron or metal work, cables, and for similar purposes, which consists in fusing at white heat quicklime, quartz, feldspar, alumina, and sulfate of soda in such proportions as will, at said white heat, yield a clear, highly-viscous mass, crushing the resulting flux to a powder, and adding said powder to melted asphalt.

3. The method of preparing a material for protecting iron or metal work, cables, and for similar purposes, which consists in fusing at white heat quicklime, quartz, feldspar, and alumina in such quantities as will yield, in the presence of carbon, a clear, highly-viscous mass, crushing the resulting flux to powder, and adding said powder to melted asphalt, the temperature of which is raised while said powder is being added.

In testimony whereof I have hereunto set my hand in the presence of two subscribing witnesses.

WILLIAM O. EMERY.

Witnesses:
 M. E. CLODFELLER
 W. D. GRIFFITH.